United States Patent
Lee

(10) Patent No.: US 7,280,452 B2
(45) Date of Patent: Oct. 9, 2007

(54) OPTICAL RECORDING/REPRODUCING APPARATUS CAPABLE OF REPRODUCING BACKUP RECORDED INFORMATION IN CASE OF A POWER FAILURE AND RECORDED INFORMATION BACKUP METHOD THEREOF

(75) Inventor: Cheon-seong Lee, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 559 days.

(21) Appl. No.: 10/947,445

(22) Filed: Sep. 23, 2004

(65) Prior Publication Data
US 2005/0169612 A1 Aug. 4, 2005

(30) Foreign Application Priority Data
Jan. 29, 2004 (KR) .................. 10-2004-0005696

(51) Int. Cl.
*G11B 27/36* (2006.01)
(52) U.S. Cl. .................. 369/53.18; 369/53.31; 386/95; 711/162
(58) Field of Classification Search .............. 369/53.18, 369/53.31, 53.44; 386/95, 125; 711/162; 713/340
See application file for complete search history.

(56) References Cited

U.S. PATENT DOCUMENTS

| | | | | |
|---|---|---|---|---|
| 5,103,318 A | * | 4/1992 | Takaoka | 358/404 |
| 6,339,814 B1 | * | 1/2002 | Iida | 711/161 |
| 6,552,976 B1 | * | 4/2003 | Iida | 369/47.15 |
| 7,062,156 B2 | * | 6/2006 | Nakatani et al. | 386/125 |
| 2001/0029511 A1 | | 10/2001 | Burda et al. | 707/202 |
| 2002/0018644 A1 | * | 2/2002 | Isobe et al. | 386/95 |
| 2005/0157619 A1 | * | 7/2005 | Miyawaki et al. | 369/47.32 |

FOREIGN PATENT DOCUMENTS

| | | | |
|---|---|---|---|
| JP | 03238536 A | * | 10/1991 |
| JP | 2002-084498 | | 3/2002 |
| JP | 2003-059051 | | 2/2003 |
| WO | 01/35406 | | 5/2001 |
| WO | 02/50829 | | 6/2002 |

* cited by examiner

*Primary Examiner*—Thang V. Tran
(74) *Attorney, Agent, or Firm*—Roylance, Abrams, Berdo & Goodman, L.L.P.

(57) ABSTRACT

An optical recording/reproducing apparatus capable of backing up recorded information in case of an electrical power failure and a recorded information backup method thereof. Management information on recorded data is stored in a local memory such as a static random access memory (SRAM), when data is recorded into an optical storage medium. The management information is updated every predetermined period, and, if data for a corresponding title is completely recorded, the management information stored in the SRAM is recorded onto a certain area of the optical storage medium. If a power failure occurs during the recording of the data, a built-in battery operates and applies a predetermined voltage to the SRAM, so that the management information stored in the SRAM is maintained during the power failure. If the power is re-applied, it is determined whether a recording flag is set in the SRAM, and, if the recording flag has been set, the management information stored in the SRAM is recorded onto the optical storage medium.

10 Claims, 3 Drawing Sheets

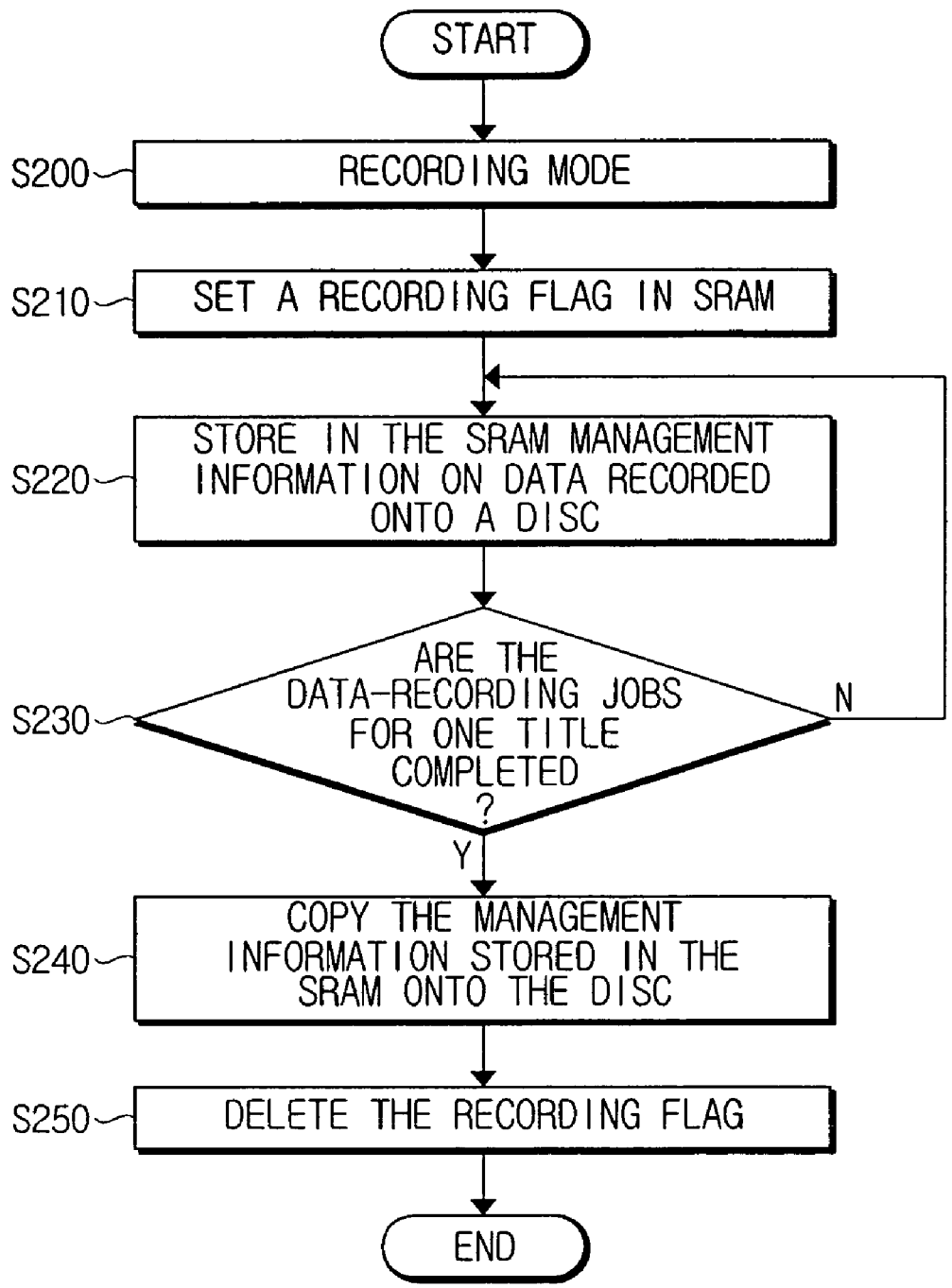

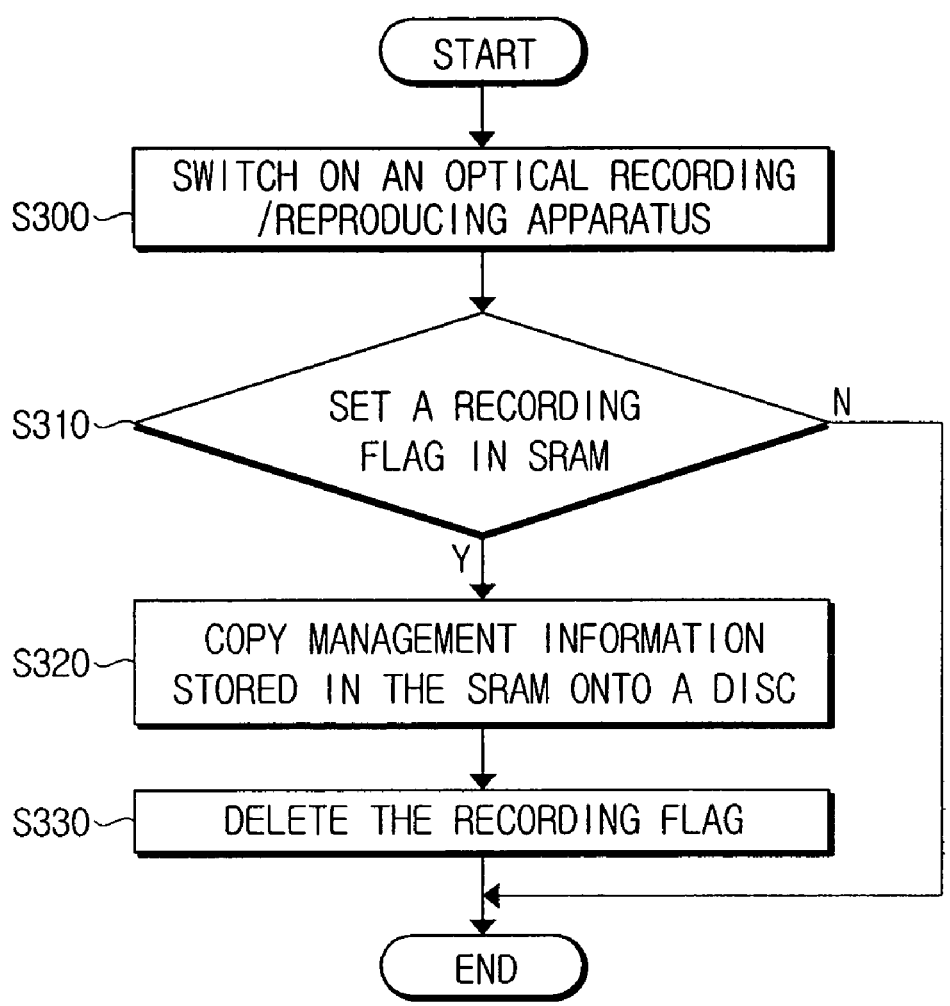

OPTICAL RECORDING/REPRODUCING APPARATUS CAPABLE OF REPRODUCING BACKUP RECORDED INFORMATION IN CASE OF A POWER FAILURE AND RECORDED INFORMATION BACKUP METHOD THEREOF

PRIORITY

This application claims the benefit under 35 U.S.C. § 119(a) from Korean Patent Application No. 2004-5696 filed on Jan. 29, 2004 in the Korean Intellectual Property Office, the entire content of which is incorporated herein by reference.

BACKGROUND OF THE INVENTION

1. Field of the Invention

The present invention generally relates to an optical recording/reproducing apparatus and recorded information backup method thereof in case of a power failure. More particularly, the present invention is directed to an optical recording/reproducing apparatus and recorded information backup method thereof capable of reading information or data recorded on an optical recording media even in case of an abnormal termination of data-recording jobs during recording data onto optical recording media.

2. Description of the Related Art

Optical recording/reproducing apparatuses for digital video disc (DVD) or hard disc drive (HDD) media are becoming popular, and replacing video cassette recorders (VCRs). The optical recording/reproducing apparatus for encoding and recording desired images in a digital format is excellent in terms of image and sound quality when reproducing recorded data as well as for searching for desired recorded data, so that the demand for the apparatuses is expected to greatly increase in the future.

Typically, optical storage media are classified into read-only storage media such as Compact Disc-Read Only Memory (CD-ROM) and Digital Versatile Disc or Digital Video Disc-ROM (DVD-ROM), write-once storage media such as CD-Recordable (CD-R) and DVD-R, and rewritable storage media such as DVD-RW and DVD-Random Access Memory (RAM).

Upon recording information or data onto writable optical storage media such as R, RW, and RAM, the optical recording/reproducing apparatus directly records substantial video and audio data (AV data) onto the optical storage media, temporarily stores in its internal memory such as volatile memory, management information on the AV data to be recorded onto the optical storage media, and updates the optical storage media with the management information when the data is completely recorded. The AV data recorded on the optical storage media can be reproduced only when the management information stored in the internal memory is updated.

However, if data-recording processes are interrupted due to the system shutdown caused by an abrupt electric power outage such as a power failure before the optical storage media are updated with management information stored in the internal memory, the management information stored in the internal memory is lost. Thus, the recorded data cannot be reproduced since the management information is not recorded even through the AV data has been recorded on the optical storage media.

SUMMARY OF THE INVENTION

The present invention has been developed in order to solve the above drawbacks and other problems associated with the conventional arrangement. An exemplary aspect of the present invention is to provide an optical recording/reproducing apparatus and recorded information backup method thereof capable of reading information or data recorded on an optical storage media even in the case of an abnormal termination of data-recording jobs due to power failure and the like during recording data onto optical storage media.

The forgoing and other aspect and advantages are substantially realized by providing an optical recording/reproducing apparatus in which an encoder encodes data in a predetermined format and stores management information stored in a local memory such as a Static Random Access Memory (SRAM) when the encoded data is recorded onto a data storage area of an optical storage medium loaded in a disc driver. The management information is updated at predetermined periods, and, if the data for a corresponding title has been completed, the management information stored in the SRAM is recorded in a predetermined area of the optical storage medium.

The management information preferably includes a title name for data, Video Object (VOB) recording start time, recording time information on a first image data of the VOB, time map management information, and Video Object Unit (VOBU).

When data-recording operations start according to a data-recording request signal, a recording flag is set in a SRAM, and, if data for a corresponding title has been completely recorded, the recording flag is deleted.

If an electrical power failure occurs during the recording operations, a built-in battery operates in order for a certain voltage to be applied to the SRAM, so that the management information stored in the SRAM is maintained during the power failure. If electric power is re-applied, it is checked whether the recording flag has been set in the SRAM. When the recording flag has been set, the management information stored in the SRAM is recorded in the optical storage medium.

Thus, an embodiment of the present invention reproduces data recorded on the optical storage media by use of the management information stored in the SRAM even when the data-recording jobs are abnormally terminated due to a power failure.

BRIEF DESCRIPTION OF THE DRAWING FIGURES

The above aspects and features of the present invention will be more apparent by describing certain embodiments of the present invention with reference to the accompanying drawing figures, in which:

FIG. 2 is a flowchart illustrating a data-recording method for the optical recording/reproducing apparatus of FIG. 1; and FIG. 3 is a flowchart illustrating an information backup method when an electrical power failure occurs during the recording of data.

Throughout the drawings, it should be noted that the same or similar elements are denoted by like reference numerals.

DETAILED DESCRIPTION OF THE EXEMPLARY EMBODIMENTS

Figure 1:
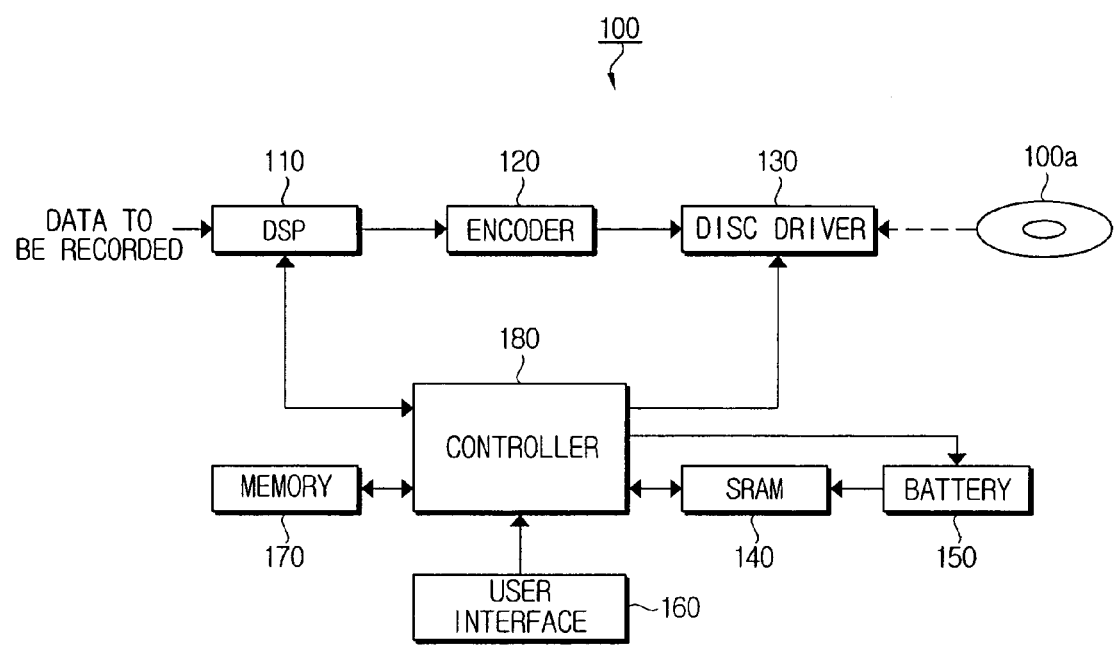
FIG. 1 is a block diagram illustrating an optical recording/reproducing apparatus according to an embodiment of the present invention.

Hereinafter, the present invention will now be described in detail with reference to the accompanying drawing figures.

FIG. 1 illustrates an optical recording/reproducing apparatus according to an embodiment of the present invention. Referring to FIG. 1, an optical recording/reproducing apparatus 100 has a digital signal processor (DSP) 110, an encoder 120, a disc driver 130, a Static Random Access Memory (SRAM) 140, a battery 150, a user interface 160, a memory 170, and a controller 180. For the purpose of conciseness, FIG. 1 shows only the components of the optical recording/reproducing apparatus 100 that are related to the recording of data.

The DSP 110 converts into digital data a video/audio signal (AV signal) provided from diverse image sources, and applies an error correction code (ECC) to the converted digital data to obtain a recording format. The diverse image sources comprise terrestrial television broadcasts, satellite broadcasts, digital broadcast sources (DBS), computers, and camcorders, for example.

The encoder 120 encodes into a predetermined compression format the digital AV data applied from the DSP 110 according to the controls of the controller 180, and generates substantial data streams. The Moving Pictures Expert Group-2 (MPEG-2) standard can be employed for the compression format in the encoder 120. The MPEG-2 standard is a compression format used to record moving pictures, and the Joint Photographic Experts Group (JPEG) standard as a still image compression format is preferably applied to data for still images, but the formats are not confined to the above described compression formats.

The disc driver 130 includes an optical drive, an optical pickup, and a servo to record the data streams encoded by the encoder 120 onto a loaded optical storage medium 100a, or to read the recorded data. According to an embodiment of the present invention, the optical storage medium 100a can be a rewritable Digital Video Disk-Random Access Memory (DVD-RAM) or Digital Video Disk-ReWritable (DVD-RW). The DVD-RAM is employed as an example below.

The SRAM 140, which is used as a local memory, stores management information on data to be recorded onto the optical storage medium 100a, and a recording flag is set when recording operations are initiated. The SRAM 140 is a memory device for safely storing data by keeping bi-stable states each corresponding to the binary numbers 0 and 1 by use of the property of a bi-stable logic circuit such as a flip-flop, as long as electric power is applied to the memory device, and has an access speed faster than a dynamic RAM since no refreshing operations are needed. The battery is provided to supply constant electric power to the SRAM 140 in case of an abrupt outage of electric power to a system due to electric power shutdown and the like during data-recording operations.

The user interface 160 receives a user operation signal for setting up or selecting a function supported by the optical recording/reproducing apparatus 100, and applies the signal to the controller 180. The user interface 160 inputs the user operation signal by a user through a key panel provided on the main body of the optical recording/reproducing apparatus 100 or through a remote controller. In an embodiment of the present invention, the user interface 160 inputs a data-recording request signal from a user, and outputs the data-recording request signal to the controller 180.

The memory 170 stores control programs and operating programs for controlling and managing the overall operations of the optical recording/reproducing apparatus 100.

The controller 180 controls the overall operations of the optical recording/reproducing apparatus 100 based on the operating programs and control programs that are stored in the memory 170. The optical recording/reproducing apparatus 100 according to an embodiment of the present invention operates in a recording mode for recording data onto the optical storage medium 100a or in a reproducing mode for reading and reproducing data recorded in the optical storage medium 100a according to an input signal by a user.

The optical storage medium 100a is divided into a lead-in area, a file information storage area, a data storage area, and a lead-out area. The lead-in area has list information on data recorded in the data storage area, and the file information storage area has a manage information file for managing data files recorded in the data storage area. The data storage area has substantial data streams recorded, and the lead-out area has information indicating the end of data recorded in the data storage area.

The SRAM 140 stores management information on the data streams being recorded in the data storage area, and the management information is updated at predetermined periods. The management information stored in the SRAM 140 is updated into the file information storage area every time data-recording operations for one title are completed.

In general, the optical storage medium 100a is managed by the Universal Disc Format (UDF) file system. The DVD-RAM file system structure includes the DVD Real Time Audio Video (DVD_RTAV) directory under the root directory, AV file (VR_MOVIE.VRO) having at least one Video Object (VOB) under the DVD_RTAV directory, and the management information file (VR_MAGR.IFO) having various kinds of management information pieces. The management information stored in the SRAM is copied into the management information file (VR_MANGR.IFO) recorded in the file information storage area every time data-recording operations for one title is completed. The information stored in the management information file (VR_MANGR.IFO) can be AV data title names, the number of titles, VOB recording start times, time information (year/month/date/time/minute/second) on when first image data of the VOB are recorded, information on the VOB units included in the VOB, and so on.

The controller 180 controls the disc driver 130 upon recording data in order for the substantial data streams to be recorded into the data storage area of the optical storage medium 100a. The controller 180 updates the SRAM 140 with the management information on the data being recorded at predetermined periods. The operations are repeated till the data-recording operations for one title are completed, and, if the data-recording operations for one title have been completed, the management information stored in the SRAM 140 is copied into the management information file (VR_MANGR.IFO).

A portion of the SRAM 140 is allocated as a recording flag setup area for indicating whether or not the data-recording jobs have been completed. The controller 180 sets up the recording flag when the recording operations start in response to a data-recording request signal. The controller 180 deletes the recording flag if the management information stored in the SRAM 140 has been completely copied into the management information file (VR_MANGR.IFO).

FIG. 2 illustrates a data-recording method for the optical recording/reproducing apparatus of FIG. 1.

Referring to FIG. 2, the optical recording/reproducing apparatus 100 is set in the recording mode in response to the data-recording request signal from the user interface 160 at step S200. The controller 180 sets a recording flag in a predetermined area allocated in the SRAM 140 at step S210.

The controller 180 controls the encoder 120 to encode data converted into a recording format by the DSP 110. The encoder 120 produces data streams in the video object unit (VOBU) according to the controls of the controller 180, and sends VOBU information (VOBUI) to the controller 180 each time a VOBU unit of data streams is produced.

Each time a VOBU unit of data streams is produced by the encoder 120, the controller 180 has the encoded substantial data streams recorded into the data storage area of the optical storage medium 100a, and has management information stored into the SRAM 140. The management information refers to information on the data streams recorded into the data storage area. The management information is updated at predetermined times, for example, every 0.5 seconds at step S220.

The controller 180 checks whether the data-recording operations for one title have been completed at step S230. If it is determined that the data-recording jobs have not been completed, the controller 180 returns to step S220 so that the data-recording operations continue to be performed. If it is determined that the data-recording jobs for one title have been completed, the controller 180 controls the disc driver 140 in order for the management information stored in the SRAM 140 to be copied into the management information file (VR_MANGR.IFO) recorded in the storage area at step S240. When the recording flag is completely copied into the management information file (VR_MANGR.IFO), the controller 180 deletes the recording flag at step S250.

According to an embodiment of the present invention, when the data-recording operations have been abnormally terminated due to an electric power outage during the recording of data, the controller 180 detects the power outage, operates the battery 150, and applies electric power to the SRAM 140.

FIG. 3 illustrates a method for reproducing recorded information in case of an electrical power failure during the recording of data. If power is re-applied to the optical recording/reproducing apparatus 100 after the electrical power failure at step S300, the controller 180 checks the state of the recording flag set in the SRAM 140, and determines whether the recording operations have been normally terminated at step S310. If the recording flag has been set, the controller 180 determines that the data-recording jobs have been abnormally terminated, and, if the recording flag has not been set, the controller 180 determines whether the data-recording jobs have been normally terminated.

If it is determined as a result of the recording flag check that the data-recording jobs have been abnormally terminated, the controller 180 can read the data recorded in the data storage area by use of the management information stored in the SRAM 140. For example, if the data-recording jobs have been terminated due to power failure when data streams for the three titles are all recorded into the data storage area and management information on only two titles are recorded, information on the third title that is recorded onto the optical storage medium 100a cannot be read. However, since the management information on the third title is stored in the SRAM 140, the controller 180 can read the third title by use of the management information stored in the SRAM 140. That is, by updating the management information stored in the SRAM 140 into the management information file (VR_MANGR.IFO) recorded in the file information storage area, the controller 180 can reproduce data in the third title that is recorded in the data storage area at step S320. The controller 180 deletes the recording flag of the SRAM 140 after updating the management information file (VR_MANGR.IFO) with the management information on the third title interrupted during the recording of data at step S330.

Therefore, the embodiments of the present invention can reproduce data recorded in an optical storage media by using management information stored in the SRAM, even when data-recording jobs are abnormally terminated due to an electric power failure.

As stated above, the embodiments of the present invention update management information on recorded data into the SRAM with a battery at predetermined periods, so that, even when data-recording jobs are abnormally terminated due to an electric power failure, the embodiments of the present invention can reproduce data recorded in the optical storage media by using the management information stored in the SRAM.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An optical recording/reproducing apparatus, comprising:
    an encoder for encoding data into a predetermined format;
    a disc driver for recording the encoded data into a data storage area of a loaded optical storage medium;
    a memory for storing management information on the data recorded in the optical storage medium;
    a battery for supplying a predetermined voltage to the memory when an electrical power failure occurs; and
    a controller for updating the memory with the management information at predetermined periods, controlling the disc driver in order for the management information to be recorded into a certain area of the optical storage medium if data-recording operations for a corresponding title have been completed, and operating the battery by detecting the power failure.

2. The optical recording/reproducing apparatus as claimed in claim 1, wherein the controller sets up a recording flag in the memory when recording operations start in response to a data-recording request signal, and deletes the recording flag when the data-recording operations for the corresponding title are completed.

3. The optical recording/reproducing apparatus as claimed in claim 2, wherein the controller checks whether the recording flag is set when electric power is applied, and, if the recording flag is set as a result of the check, the controller records the management information stored in the memory into the optical storage medium.

4. The optical recording/reproducing apparatus as claimed in claim 1, wherein the memory is a static random access memory (SRAM).

5. The optical recording/reproducing apparatus as claimed in claim 1, wherein the management information includes at least one of a title name for data, Video Object (VOB) recording start time, recording time information on first image data of the VOB, time map management information, and Video Object Unit (VOBU).

6. A recorded information backup method for optical recording/reproducing apparatus in case of an electrical power failure, comprising:
(a) setting a recording flag in a memory when data-recording operations start according to a data-recording request signal;
(b) storing in the memory, management information on data recorded onto an optical storage medium during the recording operations;
(c) operating a battery for supplying a voltage to the memory when an electrical power failure occurs during the recording operations;
(d) detecting whether the recording flag is set in the memory if electric power is re-applied; and
(e) reading the management information stored in the memory and recording the management information in a predetermined area of the optical storage medium, when the recording flag is set.

7. The recorded information backup method as claimed in claim 6, further comprising recording the management information into a certain area of the optical storage medium and deleting the recording flag if data for a corresponding title is completely recorded.

8. The recorded information backup method as claimed in claim 6, wherein the step (b) updates the management information at predetermined periods.

9. The recorded information backup method as claimed in claim 6, wherein the memory is a static random access memory (SRAM).

10. The recorded information backup method as claimed in claim 6, wherein the management information includes at least one of a title name for data, Video Object (VOB) recording start time, recording time information on first image data of the VOB, time map management information, and Video Object Unit (VOBU).

* * * * *